MULTIPLE DELAY CIRCUIT

Filed Oct. 7, 1958 3 Sheets-Sheet 1

INVENTOR.
STEPHEN E. TOWNSEND
ROBERT H. RUGABER
BY
Richard G. Stahr
ATTORNEY

MULTIPLE DELAY CIRCUIT

Filed Oct. 7, 1958 3 Sheets-Sheet 2

United States Patent Office 2,933,625

Patented Apr. 19, 1960

2,933,625

MULTIPLE DELAY CIRCUIT

Stephen E. Townsend and Robert H. Rugaber, Rochester, N.Y., assignors to General Dynamics Corporation, Rochester, N.Y., a corporation of Delaware Application October 7, 1958, Serial No. 765,895

3 Claims. (Cl. 307—88.5)

Figure 1:
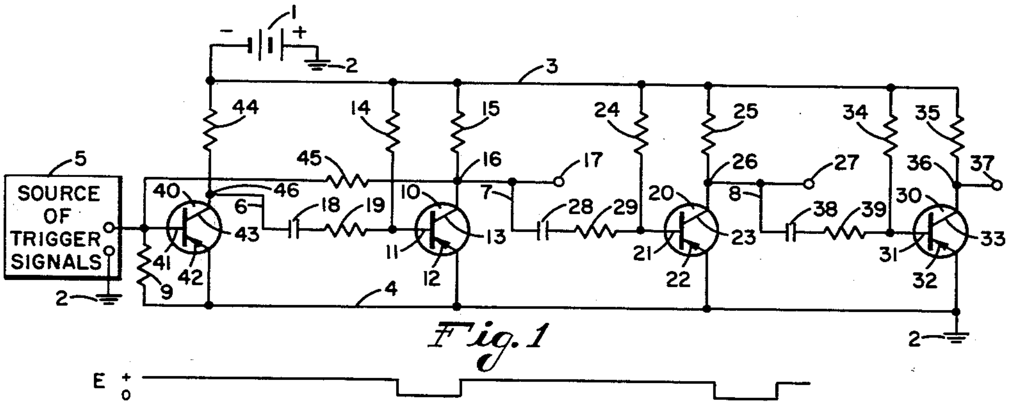

This invention relates to multiple delay circuits and, more specifically, to a circuit for producing a series of electrical signals in timed relationship with each other.

In digital systems, it is frequently necessary to provide a circuit which produces a series of several pulses in timed relationship with each other in respect to trigger pulses or a source of electrical reference signals. That is, upon or immediately following the occurrence of a trigger pulse or an electrical reference signal, a series of pulses are produced which are delayed by various time intervals.

In the prior art, this has generally been accomplished through the medium of cascading a series of delay multivibrators or by triggering a series of delay multivibrators with varying time constants from the trigger or initiating pulse. These methods, however, have proven objectionable in that a delay multivibrator and two transistors (or other active elements) are required for each output pulse, which results in the use of two transistors or other active elements per delayed pulse provided.

It is accordingly an object of this invention to provide an improved multiple delay circuit.

It is another object of this invention to provide a multiple delay circuit which substantially reduces the number of required components.

It is another object of this invention to provide an improved multiple delay circuit involving simple circuitry which is reliable in operation.

In accordance with this invention, a plurality of normally conducting current translating devices of the type which may be rendered nonconducting in response to the application thereto of a selected polarity electrical signal and which produce in individual output circuits a constant potential level output signal, the leading edge of which is of the selected polarity to which each of said devices is responsive, when in a state of conduction, are employed. Each of the plurality of devices is provided with an input circuit, including a delay circuit, for sensing the leading edge of a constant potential level signal and maintaining the device in a state of nonconduction during a selected time interval. A source of electrical signals of the selected polarity to which each of the devices is responsive and the output circuits of each of the devices are connected mutually exclusive of each other to individual ones of the several input circuits in such a manner that selected ones of the devices may be rendered nonconducting in response to the source of electrical signals while the remainder of the devices are rendered nonconductive in response to the output signal appearing in the output circuit to which it is connected. Through this circuit arrangement, the series of constant potential level signals appear in the output circuit of each of the devices in a timed relation with each other and may be taken off and applied to external equipment through output circuit terminals provided therefor.

Figure 1A:
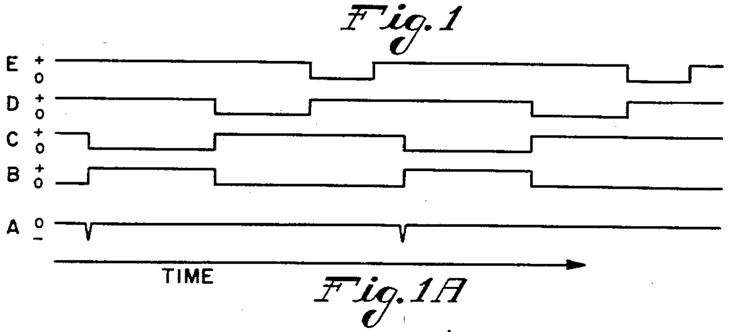
Figure 2:
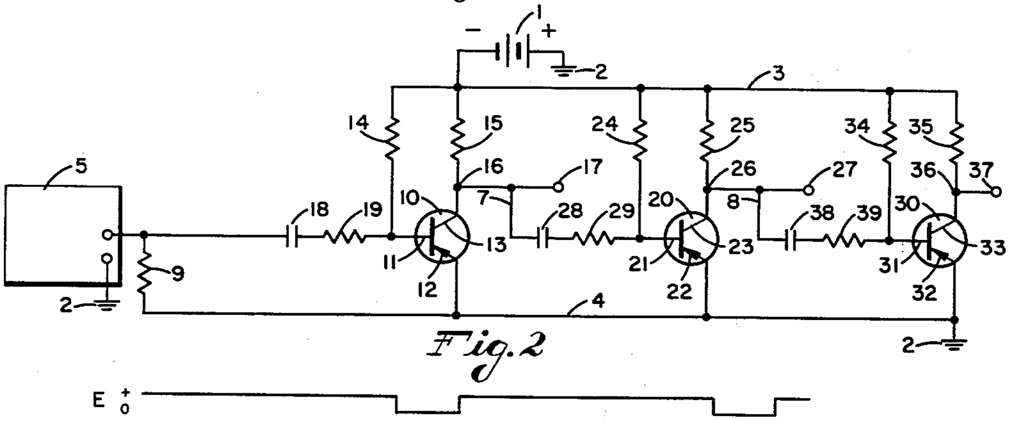
Figure 2A:
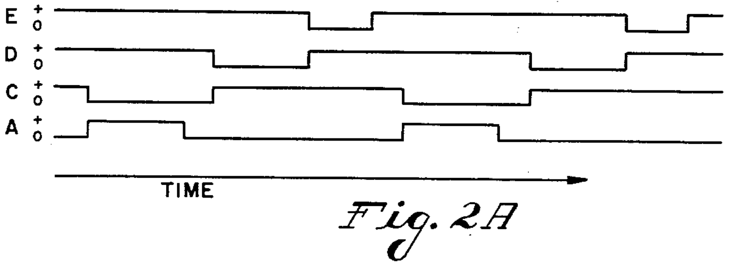
Figure 3:
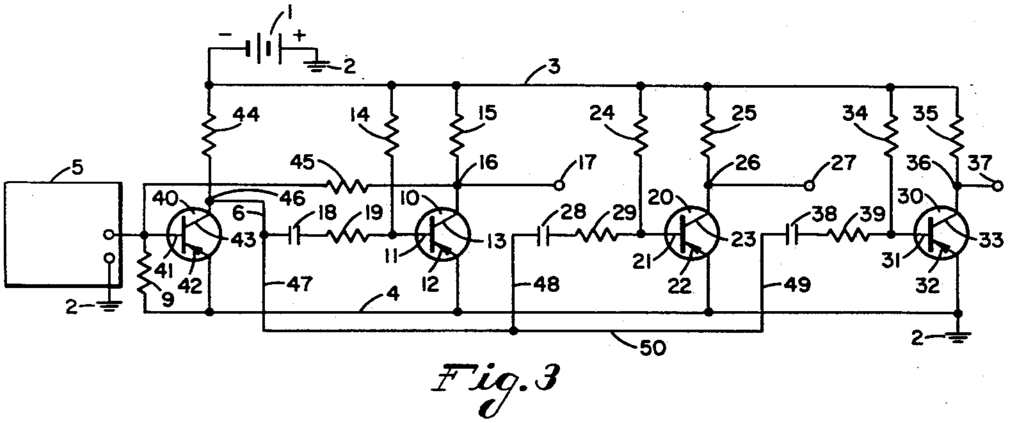
Figure 3A:
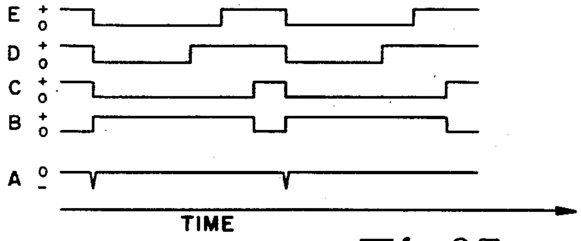
Figure 4:
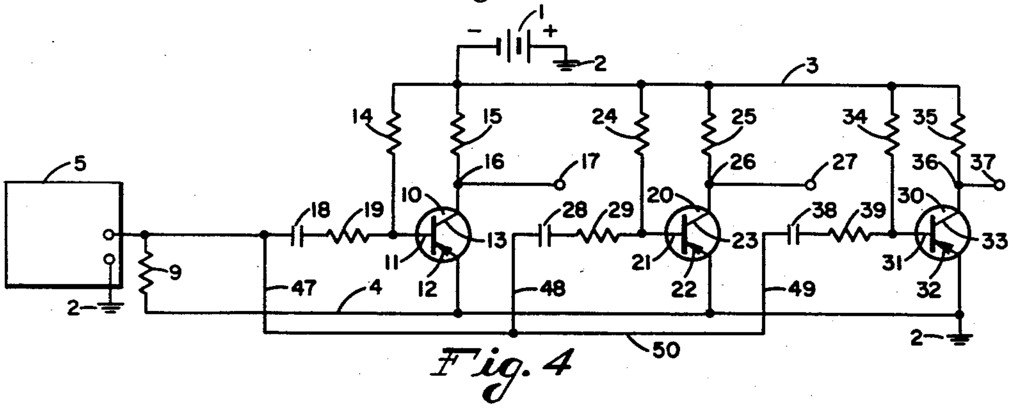
Figure 4A:
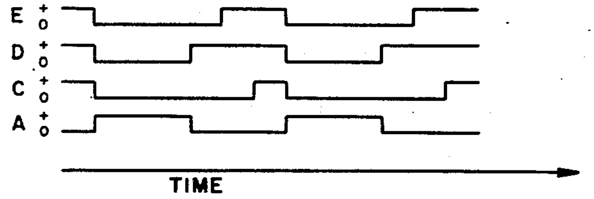
Figure 5:
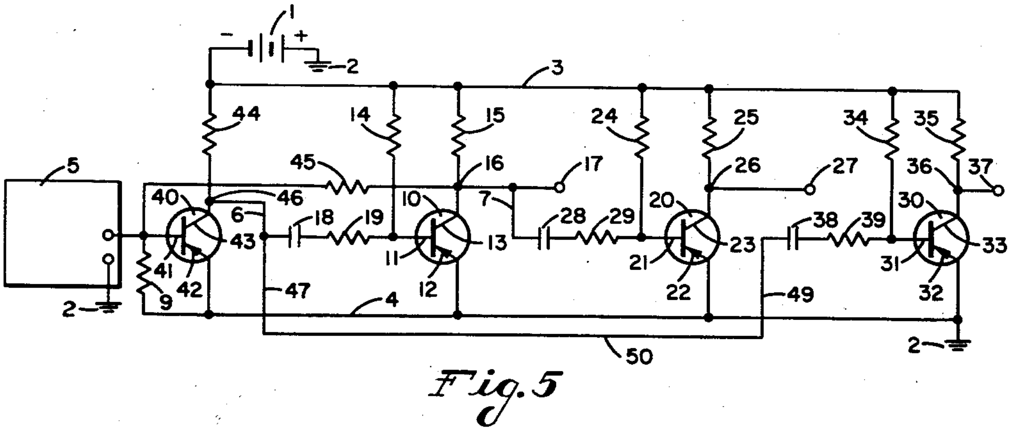
Figure 5A:
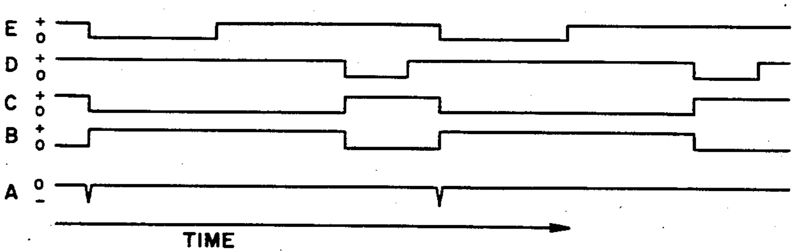
Figure 6:
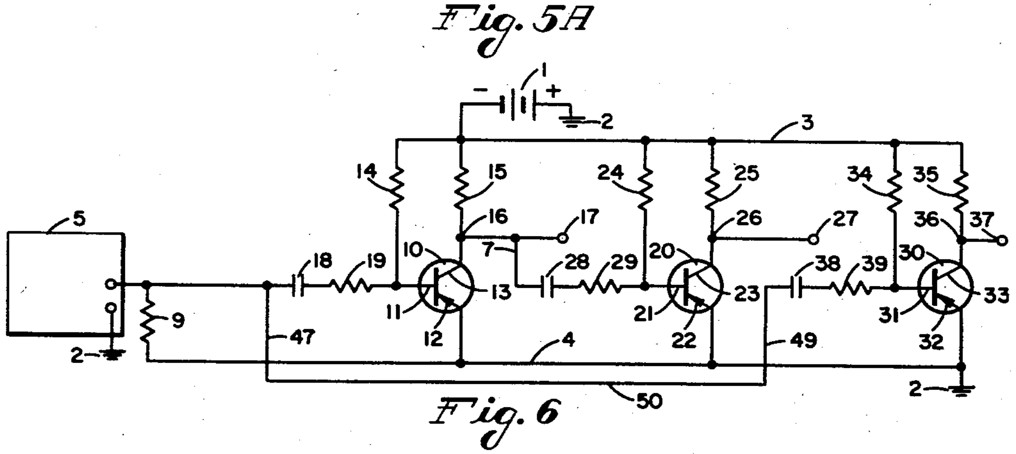
Figure 6A:
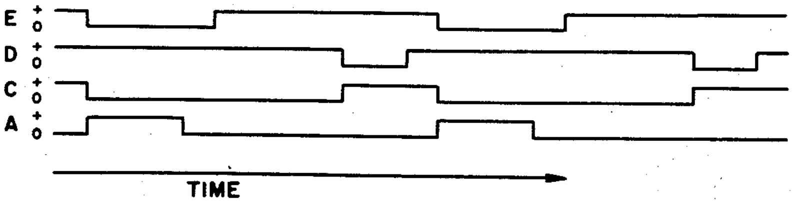

For a better understanding of the present invention, together with further objects, advantages and features thereof, reference is made to the following description and accompanying drawings, in which:

Figure 1 illustrates a preferred embodiment of the multiple delay circuit of this invention;

Figure 1*a* graphically illustrates the various constant potential level signals obtained from the circuit illustrated in Figure 1;

Figure 2 illustrates a refinement of the circuit shown in Figure 1;

Figure 2*a* graphically illustrates the various constant potential level signals obtained from the circuit illustrated in Figure 2;

Figure 3 illustrates another embodiment of the multiple delay circuit of this invention;

Figure 3*a* graphically illustrates the constant potential level signals obtained from the circuit illustrated in Figure 3;

Figure 4 illustrates a further refinement of the circuit illustrated in Figure 3;

Figure 4*a* graphically illustrates the various constant potential level signals obtained from the circuit of Figure 4;

Figure 5 illustrates a third embodiment of the multiple delay circuit of this invention;

Figure 5*a* graphically illustrates the various constant level potential pulse forms obtained from the circuit of Figure 5;

Figure 6 illustrates a further refinement of the circuit illustrated in Figure 5; and Figure 6*a* graphically illustrates the various constant potential level signals obtained from the circuit of Figure 6.

As each of the circuits of Figures 2, 3, 4, 5 and 6 of this specification are essentially refinements of the circuit illustrated in Figure 1, like elements in the several figures are given like characters of reference.

The circuit of this invention is founded upon the use of a plurality of normally conducting current translating devices of the type which may be rendered nonconducting in response to the application thereto of a selcted polarity electrical signal. While these current translating devices may be of any suitable type, they have been illustrated in Figure 1 as type P–N–P transistors at reference numerals 10, 20 and 30. Each of these transistor units include the usual base, emitter and collector electrodes indicated at reference numerals 11, 21 and 31; 12, 22 and 32; and 13, 23 and 33, respectively.

To provide a source of operating potential for transistors 10, 20 and 30, a battery, indicated at reference numeral 1, having its positive terminal connected to point of reference potential 2 and its negative terminal connected to bus 3 is provided. The respective collectors 13, 23 and 33 of transistors 10, 20 and 30 are connected to the negative terminal of battery 1 through respective load resistors 15, 25 and 35 and bus 3, while the respective bases 11, 21 and 31 of transistors 10, 20 and 30 are also connected to the negative terminal of battery 1 through respective base bias resistors 14, 24 and 34 and bus 3. To complete the connection of each transistor 10, 20 and 30 to the source of operating potential battery 1, the respective emitters 12, 22 and 32 are connected to the positive terminal of battery 1 through bus 4 and point of reference potential 2. As the bias requirements for conduction through type P–N–P transistors are satisfied with these connections, that is, the bases are negative in respect to the emitters and the collectors are negative, transistors 10, 20 and 30 are all in a state of conduction. To render any or all of the transistors 10, 20 or 30 nonconductive, a positive electrical signal of a sufficient magnitude to destroy the required base-emitter bias requirements for conduction through a type P–N–P transistor may be applied to the respective bases 11, 21 or 31.

Each of the transistors 10, 20 and 30 is provided with a first individual output circuit consisting of load resistor 15, collector 13 and emitter 12; load resistor 25, collector 23 and emitter 22; and load resistor 35, collector 33 and emitter 32, respectively. During the period of conduction through any or all of the transistors 10, 20 or 30, a constant potential level output signal appears in these respective first individual output circuits, the leading edge of which is of the selected polarity, in this instance positive, to which each of the transistors is responsive, and may be taken off at points 16, 26 or 36, respectively. That is, during periods of nonconduction through any of the transistors 10, 20 or 30, the potential at points 16, 26 or 36 will be zero and will increase in a positive direction to a magnitude substantially equal to the potential of source 1 as any of the transistors 10, 20 or 30 is rendered conductive.

Each of the transistors 10, 20 and 30 is also provided with an individual input circuit consisting of base 11 and emitter 12, base 21 and emitter 22, and base 31 and emitter 32, respectively, and includes a delay circuit comprised of capacitor 18 and resistor 19, capacitor 28 and resistor 29, and capacitor 38 and resistor 39, respectively. These delay circuits are sensitive to the edges of a constant potential level signal and serve to maintain the associated transistor in a state of nonconduction over a selected time interval in a manner to be later explained.

A source of electrical reference signals of the selected polarity, in this instance positive, to which each of the transistors is responsive is also provided and, while this may be any suitable signal source, has herein been indicated as another type P–N–P transistor and is indicated at reference numeral 40. Transistor 40 is provided with the usual base, emitter and collector electrodes, indicated by reference numerals 41, 42 and 43, respectively. As the base 41 and emitter 42 of transistor 40 are at substantially the same potential, the base-emitter bias requirements for conduction through a type P–N–P transistor are not satisfied. To render transistor 40 conducting, a negative pulse of a sufficient magnitude to establish the proper base-emitter bias requirements for conduction through a type P–N–P transistor may be applied to the base 41. This negative signal may be in the form of negative trigger pulses originating in associated equipment. As this associated equipment is well known in the art and the details form no part of this invention, it is indicated in Figure 1 in block form at reference numeral 5. As a negative trigger signal appears at the base 41 of transistor 40, transistor 40 is rendered conductive and a constant potential level signal appears in its output circuit consisting of load resistor 44, collector 43 and emitter 42 and may be taken off from point 46. As this constant level potential signal is positive-going at the instant of conduction through transistor 40, it is of the polarity to which transistors 10, 20 and 30 are responsive.

For the proper operation of the circuit of this invention, the source of electrical reference signals, transistor 40 in this instance, and the respective output circuits of each of the transistors 10, 20 and 30 must be connected mutually exclusive of each other to individual ones of the input circuits of the several transistors 10, 20 and 30 in such a manner that selective ones of the transistors may be rendered nonconductive in response to the source of electrical reference signals, transistor 40, while the remainder of the transistors may be rendered nonconductive in response to the constant potential level output signal appearing in the respective output circuit of the transistor to which it is connected. In the circuit as illustrated in Figure 1, the source of electrical reference signals, transistor 40, is connected to the input circuit of transistor 10 through lead 6, the individual output circuit of transistor 10 is connected to the input circuit of transistor 20 through lead 7, while the individual output circuit of transistor 20 is connected to the input circuit of transistor 30 through lead 8. Various other combinations of connections will be illustrated and explained in detail later in this specification.

As the constant potential level signals appearing in the individual output circuits of transistors 10, 20 and 30 may be utilized for controlling remaining portions of the circuit of Figure 1 and also may be taken off and used in equipment external to the circuit of this invention, second individual output circuits are provided for each of the transistors 10, 20 and 30 and are indicated as output terminals at 17, 27 and 37, respectively. As the respective transistors 10, 20 and 30 are rendered nonconductive and conductive under the influence of the source of electrical reference signals, transistor 40, constant potential level signals appear at terminals 17, 27 and 37 in timed relationship with each other in a manner now to be explained.

As a short negative trigger pulse, illustrated by curve A in Figure 1*a*, emanates from source 5 and is applied to the base 41 of transistor 40, the base-emitter bias requirement for conduction through a type P–N–P transistor is satisfied. As transistor 40 begins conduction, a constant potential level reference signal is produced across load resistor 44 and appears at point 46, as illustrated by curve B of Figure 1*a*. As the leading edge of this signal is positive-going, point 46 goes positive placing a positive charge upon capacitor 18 of the delay circuit portion of the input circuit of transistor 10. As the base of transistor 10 goes positive, the base-emitter bias requirement for conduction through a type P–N–P transistor is destroyed, thereby rendering transistor 10 nonconductive. Even though the short negative trigger pulse emanating from source 5 is removed from the base 41 of transistor 40, transistor 40 is maintained in a state of conduction in that point 16 in the output circuit of transistor 10 has now assumed a negative potential due to the extinguishing of transistor 10, this potential being applied to the base 41 of transistor 40 through resistor 45. Depending upon the time constant characteristics of the circuit comprising capacitor 18 and resistors 19 and 14, transistor 10 is maintained in a condition of nonconduction until the positive charge of capacitor 18 has dissipated through resistors 19 and 14. At this time, the base 11 of transistor 10 again assumes a negative potential through base bias resistor 14 which satisfies the base-emitter bias characteristics for conduction through a type P–N–P transistor. As transistor 10 begins conduction, a constant potential level signal is produced in its output circuit as indicated by curve C of Figure 1*a*. As the leading edge of this signal is positive-going, the potential appearing at point 16 is also positive-going. This positive-going potential is applied to the base 41 of transistor 40 through resistor 45, thereby destroying the required base-emitter bias requirement for conduction through a type P–N–P transistor, thereby rendering transistor 40 nonconductive. At the same time, the positive-going potential appearing at point 16 is applied to the capacitor 28 in the delay circuit portion of the input circuit of transistor 20 through lead 7.

As the positive-going potential appearing at point 16 places a positive charge upon capacitor 28 of the delay circuit portion of the input circuit of transistor 20, the base 21 of transistor 20 assumes a positive potential which destroys the required base-emitter bias requirement for conduction through a type P–N–P transistor, thereby rendering transistor 20 nonconductive. Depending upon the time constant characteristics of the delay circuit portion of the input circuit to transistor 20, it remains in a nonconductive state until the positive charge appearing on capacitor 28 has become dissipated through resistors 29 and 24. At this time, the base-emitter bias requirement for conduction through a type P–N–P transistor is again satisfied as the base 21 now assumes a negative potential through base bias resistor 24. As transistor 20 again resumes conduction, a constant potential level signal appears in its output circuit as indicated by curve D of Figure 1*a*.

In the same manner as has previously been described, the positive-going leading edge of the constant potential level signal appearing at point 26 in the output circuit of transistor 20 serves to render transistor 30 nonconductive through the delay circuit portion of the input circuit of transistor 30, comprising capacitor 38 and resistor 39. At the expiration of the delay time designed into the circuit comprising capacitor 38 and resistors 39 and 34, transistor 30 again assumes a state of conduction thereby producing a constant potential level output signal, as illustrated by curve E of Figure 1*a*.

As each of the constant potential level signals appearing at points 16, 26 and 36 of transistors 10, 20 and 30, respectively, are connected to the individual output terminals 17, 27 and 37, the constant potential level output signals also appear in these respective output circuits.

A slight modification of the circuit of Figure 1 is indicated in the circuit of Figure 2. It may be noted that the source of electrical reference signals, transistor 40, has been omitted from this circuit. With this circuit, therefore, the trigger signals, illustrated as curve A in Figure 2*a*, which emanate from source 5 are the electrical reference signals. For proper operation, these signals must be positive and of sufficient width to allow a complete charge of capacitor 18 of the delay circuit portion of the input circuit of transistor 10. In this event, the capacitor 18 is positively charged, thereby producing a positive potential upon the base 11 of transistor 10 which destroys the base-emitter bias requirements for conduction through a type P–N–P transistor, thereby rendering transistor 10 nonconductive. After the removal of the electrical reference signal, curve A of Figure 2*a*, transistor 10 remains in a state of nonconduction for an interval of time which is determined again by the time constant characteristics of the delay circuit comprising capacitor 18 and resistors 19 and 14 in a manner as previously described. As transistor 10 again begins conduction at the conclusion of this time interval, a constant level potential signal appears in its output circuit and point 16 as indicated by curve C of Figure 2*a*. In the same manner as has previously been described in reference to Figure 1, transistors 20 and 30 are successively placed in a state of nonconduction after which they again become conducting at the conclusion of the interval of time designed into the delay circuit portion of their respective input circuits, thereby producing at points 26 and 36, respectively, in their individual output circuits, constant potential level signals, the leading edges of which are positive-going as illustrated by curves D and E, respectively, of Figure 2*a*.

The circuit of Figure 3 is again a slight modification of the circuit of Figure 1 wherein the source of electrical reference signals, transistor 40, is again employed when the trigger signals, curve A of Figure 3*a*, are short negative pulses. The operation of this circuit is similar to that described in regard to transistor 40 and transistor 10 of Figure 1, except that in this instance transistors 10, 20 and 30 are all rendered nonconductive in response to the positive-going constant potential level reference signal produced by transistor 40, illustrated as curve B of Figure 3*a*. It will be noted that the potential appearing at point 46 in the output circuit of transistor 40 is applied to the delay network portion of the input circuit of transistor 10 through lead 6 and to the delay circuit portion of the input circuits of transistors 20 and 30 through bus 50 and leads 48 and 49. As the short negative trigger pulse produces conduction through transistor 40, transistors 10, 20 and 30 are all simultaneously rendered nonconductive, as illustrated by curves C, D and E of Figure 3*a*, in which state they remain while their respective delay circuits time out, permitting them to again assume a state of conduction in a manner as has been described before. The result is the production of a constant potential level signal, the leading edge of which is positive-going, in each of the respective output circuits successively, and may be taken off the individual output circuit terminals 17, 27 and 37, respectively.

Figure 4 is another slight modification of that shown in Figures 1 and 3 in that the source of electrical reference signals, transistor 40, is again omitted. In this event, the trigger signal emanating from source 5 becomes the electrical reference signal which must be positive-going and of sufficient width to permit a complete charge of the capacitors in the respective delay circuit portions of the respective input circuits, for the same reasons as outlined in connection with Figure 2. The curves of Figure 4*a* represent the pulses obtained through this circuit where curve A is the positive trigger pulse while curves C, D and E represent the constant potential level signals appearing in the output circuits of the transistors 10, 20 and 30, respectively.

Figures 5 and 6 are other modifications of the same circuits, wherein the transistors 10 and 30 are rendered responsive to the source of electrical reference signals, transistor 40, or to the sustained positive trigger signal, as has been explained before, while transistor 20 is rendered responsive to the constant potential level output signal of transistor 10. The curves of Figures 5*a* and 6*a* again represent the trigger and respective output waveforms of the several transistors as has been described before.

While a definite polarity relationship has been used in the description of the circuits of this invention, it is to be specifically understood that complementary transistors may also be employed with a reversal of the polarities as outlined herein.

While a preferred embodiment of the present invention has been shown and described, it will be obvious to those skilled in the art that various modifications and substitutions may be made without departing from the spirit of this invention which is to be limited only within the scope of the appended claims.

What is claimed is:

1. An apparatus for producing a series of electrical signals in timed relationship with each other comprising a plurality of normally conducting transistor devices of the type which may be rendered nonconducting in response to the application thereto of a selected polarity electrical signal, a source of electrical reference signals of the selected polarity to which each of said devices is responsive, first individual output circuit means for each of said devices in which appears a constant potential level output signal the leading edge of which is of the selected polarity to which each of said devices is responsive when the device associated therewith is in a state of conduction, individual input circuit means including time constant means having a given discharge time constant sensitive to the leading edge of a constant potential level signal applied to each of said devices for charging said time constant means to a potential more than sufficient to render said device individual thereto nonconducting, said time constant means maintaining said device individual thereto nonconductng for a selected time interval determined by said given discharge time constant thereof, means for connecting mutually exclusive of each other said source of electrical reference signals and the said first output circuit means to individual ones of said input circuit means in such a manner that selected ones of said devices may be rendered responsive to said source of electrical refrence signals while the remainder of said devices are rendered responsive to the said output signal appearing in the said first output circuit means of the device to which it is connected and second individual output circuit means for each of said device in which said constant potential level signals appear in timed relation with each other.

2. An apparatus for producing a series of electrical signals in timed relationship with each other comprising a plurality of normally conducting transistor devices of the type which may be rendered nonconducting in response to the application thereto of a selected polarity electrical signal, a source of electrical reference signals of the selected polarity to which each of said devices is responsive, first individual output circuit means for each of said devices in which appears a constant potential level output signal the leading edge of which is of the selected polarity to which each of said devices is responsive when the device associated therewith is in a state of conduction, individual input circuit means including time constant means having a given discharge time constant sensitive to the leading edge of a constant potential level signal applied to each of said devices for charging said time constant means to a potential more than sufficient to render said device individual thereto nonconducting, said time constant means maintaining said device individual thereto nonconducting for a selected time interval determined by said given discharge time constant thereof, means for connecting said source of electrical reference signals to the said individual input circuit means of the first of said devices, means for connecting the said first individual output circuit means of each of said devices to the said individual input circuit means of the next succeeding one of said devices and second individual output circuit means for each of said device in which said constant potential level signals appear in timed relation with each other.

3. An apparatus for producing a series of electrical signals in timed relationship with each other comprising a plurality of normally conducting transistor devices of the type which may be rendered nonconducting in response to the application thereto of a selected polarity electrical signal, a source of electrical reference signals of the selected polarity to which each of said devices is responsive, first individual output circuit means for each of said devices in which appears a constant potential level output signal the leading edge of which is of the selected polarity to which each of said devices is responsive when the device associated therewith is in a state of conduction, individual input circuit means including time constant means having a given discharge time constant sensitive to the leading edge of a constant potential level signal applied to each of said devices for charging said time constant means to a potential more than sufficient to render said device individual thereto nonconducting, said time constant means maintaining said device individual thereto nonconducting for a selected time interval determined by said given discharge time constant thereof, means for connecting mutually exclusive of each other said source of electrical reference signals to the said individual input circuit means of all of said devices and second individual output circuit means for each of said device in which said constant potential level signals appear in timed relation with each other.

References Cited in the file of this patent

UNITED STATES PATENTS

| | | |
|---|---|---|
| 2,614,141 | Edson et al. | Oct. 14, 1952 |
| 2,860,258 | Hall | Nov. 11, 1958 |
| 2,870,348 | Chao | Jan. 20, 1959 |